United States Patent
Leavy et al.

(10) Patent No.: US 9,246,676 B2
(45) Date of Patent: Jan. 26, 2016

(54) SECURE ACCESS FOR ENCRYPTED DATA

(71) Applicant: Cisco Technology, Inc., San Jose, CA (US)

(72) Inventors: Nicholas Read Leavy, London (GB); Venkata Krishna Sashank Dara, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 37 days.

(21) Appl. No.: 14/087,045

(22) Filed: Nov. 22, 2013

(65) Prior Publication Data

US 2015/0149772 A1    May 28, 2015

(51) Int. Cl.
H04L 29/06 (2006.01)
H04L 9/08 (2006.01)

(52) U.S. Cl.
CPC .......... H04L 9/0822 (2013.01); H04L 63/0428 (2013.01); H04L 63/0442 (2013.01); H04L 63/06 (2013.01); H04L 2209/24 (2013.01); H04L 2463/062 (2013.01)

(58) Field of Classification Search
USPC .................. 713/168, 171, 189; 380/281, 284
See application file for complete search history.

(56) References Cited

U.S. PATENT DOCUMENTS

| | | | |
|---|---|---|---|
| 6,226,618 B1 | 5/2001 | Downs et al. | |
| 6,424,718 B1* | 7/2002 | Holloway | 380/277 |
| 9,092,610 B2* | 7/2015 | Sheu et al. | H04W 12/04 380/28 |
| 2001/0014158 A1* | 8/2001 | Baltzley | 380/281 |
| 2001/0042046 A1 | 11/2001 | Fukuda | |
| 2010/0172504 A1 | 7/2010 | Allen et al. | |
| 2014/0281545 A1* | 9/2014 | Erofeev et al. | 713/171 |

FOREIGN PATENT DOCUMENTS

| | | |
|---|---|---|
| GB | 2446173 A | 8/2008 |
| WO | 03046827 A1 | 6/2003 |
| WO | 2008072234 A2 | 6/2008 |
| WO | 2013020178 A1 | 2/2013 |
| WO | 2013048418 A1 | 4/2013 |

OTHER PUBLICATIONS

Dorothy Elizabeth Robling Denning; "Cryptography and Data Security", Addison-Wesley Publishing Company, Inc., 1982, pp. 1-147 <http://faculty.nps.edu/dedennin/publications/Denning-CryptographyDataSecurity.pdf>.

(Continued)

*Primary Examiner* — Jason Lee
(74) *Attorney, Agent, or Firm* — Patterson + Sheridan, LLP (57) ABSTRACT

Embodiments generally provide techniques for managing data security. One embodiment includes providing, at a client system, an encrypted private key that can be decrypted using a locker key. Encrypted data is received from a remote system, and embodiment determine that the received encrypted data can be decrypted using a private key recovered by decrypting the encrypted private key. A request is transmitted to the remote system for the locker key corresponding to the encrypted private key, and the requested locker key is received from the remote system. Embodiments decrypt the encrypted private key using the received locker key to recover the private key, and decrypt the encrypted data, using the private key.

13 Claims, 7 Drawing Sheets

(56) References Cited

OTHER PUBLICATIONS

Dorothy Elizabeth Robling Denning; "Cryptography and Data Security", Addison-Wesley Publishing Company, Inc., 1982, pp. 135-190, <http://faculty.nps.edu/dedennin/publications/Denning-CryptographyDataSecurity.pdf>.

Dorothy Elizabeth Robling Denning; "Cryptography and Data Security", Addison-Wesley Publishing Company, Inc., 1982, pp. 191-329, <http://faculty.nps.edu/dedennin/publications/Denning-CryptographyDataSecurity.pdf>.

Dorothy Elizabeth Robling Denning; "Cryptography and Data Security", Addison-Wesley Publishing Company, Inc., 1982, pp. 331-401, <http://faculty.nps.edu/dedennin/publications/Denning-CryptographyDataSecurity.pdf>.

"CNG Key Storage Providers (Windows)", retrieved Nov. 14, 2014, pp. 1-3, <http://msdn.microsoft.com/en-us/library/windows/desktop/bb931355>.

"Homomorphic Key Encryption & Porticor's Split-Key Solution", retrieved Nov. 14, 2014, pp. 1-4, <http://www.porticor.com/homomorphic-encryption/>.

"Secret Sharing", Wikipedia, retrieved Nov. 14, 2014, pp. 1-8, <http://en.wikipedia.org/wiki/Secret_sharing>.

"Shamir's Secret Sharing", Wikipedia, retrieved Nov. 14, 2014, pp. 1-6, <http://en.wikipedia.org/wiki/Shamir%27s_Secret_Sharing>.

Stark et al.; "Stanford Javascript Crypto Library", retrieved Nov. 11, 2013, <http://bitwiseshiftleft.github.io/sjcl/>.

Matasano Security, "Javascript Cryptography Considered Harmful", retrieved Nov. 11, 2013 <http://www.matasano.com/articles/javascript-cryptography>.

European Search Report for EP 14192731, Apr. 16, 2015.

\* cited by examiner

SECURE ACCESS FOR ENCRYPTED DATA

TECHNICAL FIELD

Embodiments presented in this disclosure generally relate to data security, and more specifically to techniques for securely accessing encrypted data within a computing environment from a navigation application.

BACKGROUND

The data storage requirements faced by many businesses continue to increase. For example, computer hardware manufactures frequently use computer database systems to track service requests from customers. If such a database allows customers to supply data files (e.g., screenshots, configuration files) related to a particular service request, then the storage requirements for such a database simply grow over time. Cloud computing allows users to perform computing tasks where data, applications, and even complete virtualized computing systems are accessed over computer networks (frequently, e.g., the Internet). The network of servers and connections used to provide a computing service is generally referred to as "the cloud." Cloud storage provides an abstraction for physical storage devices to facilitate delivering data storage as a service, often billed on a usage basis. That is, cloud storage allows users to store and access data files somewhere in "the cloud," without knowing the details of where files are stored or having to manage physical storage devices. In cloud storage, capacity can be available on demand and files can be made available on a global basis.

Additionally, data (e.g., data stored in the cloud computing environment, data transmitted to the cloud computing environment, etc.) is frequently encrypted, so as to restrict access to the data from unauthorized parties (i.e., parties without a particular credential or key). For instance, by encrypting the data, hosts (e.g., cloud providers) can more securely transmit and receive data to remote systems (e.g., over a computer network), as the data cannot be decrypted without the proper security credential(s). Thus, even if the data is received by a third party, the third party could not decrypt and access the data, unless the third party has the proper security credential.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

One embodiment provides a method that includes providing, at a client system, an encrypted private key that can be decrypted using a private key recovered by decrypting the encrypted private key. The method includes receiving encrypted data from a remote system. Additionally, the method includes determining that the received encrypted data can be decrypted using a private key recovered by decrypting the encrypted private key. The method further includes transmitting a request to the remote system for a locker key corresponding to the encrypted private key. The method also includes receiving, from the remote system, the requested locker key. Moreover, the method includes decrypting the encrypted private key using the received locker key to recover the private key, and decrypting the encrypted data, using the private key.

Another embodiment provides a method that includes providing an encrypted locker key, where a locker key can be recovered by decrypting the encrypted locker key using a first key. The method includes transmitting encrypted data to a client system, wherein the encrypted data can be decrypted using a private key. Additionally, the method includes receiving a request for the encrypted locker key, the request specifying the first key. The method also includes decrypting the encrypted locker key using the first key to recover the locker key, and further includes transmitting the locker key to the client system. Here, the client system is configured to use the decrypted locker key to decrypt a private key and is further configured to use the decrypted private key to decrypt the encrypted data.

Yet another embodiment provides a method that includes receiving, within a browser application of a client system, web content from a remote system. The method also includes receiving, within the browser application of the client system, encrypted data from the remote system. Additionally, the method includes executing program code within the received web content to perform an operation that includes determining that the encrypted data can only be decrypting using both first key data stored on the client system and second key data stored on the remote system. The operation also includes retrieving the second key data from the remote system, and further includes decrypting the encrypted data, using both the first key data and the second key data.

Example Embodiments

Generally, embodiments provide techniques for managing data security between a client system and a remote system (e.g., a cloud node within a cloud computing environment). For example, the techniques described herein could be used to provide data security for data transmitted between a web browser on a client system and a web server hosted within a cloud computing environment. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet.

In one embodiment, a web browser on a client system is configured to store an encrypted key (e.g., an encrypted private key). As used herein, a key refers to data (e.g., a sequence of numbers) that can be used to decrypt encrypted data (e.g., using asymmetric cryptography techniques, symmetric cryptography technique, etc.). Generally speaking, a number of different cryptography techniques exist. Examples of such techniques include, without limitation, Advanced Encryption Standard (AES) encryption, Data Encryption Standard (DES) encryption, Elliptic Curve Cryptography (ECC), Rivest-Shamir-Adleman (RSA) encryption, the Cramer-Shoup system, the Diffie-Hellman key exchange protocol, and so on. However, the present disclosure is not limited to any particular cryptographic technique, and more generally any known (or unknown) technique for encrypting and decrypting data can be used, consistent with the functionality described herein.

Returning to the example, assume that the encrypted key stored on the client system is a private key for use in an asymmetric cryptography technique, and that the encrypted key can be decrypted using a locker key (i.e., another key, such as a separate private key). Preferably, however, such a locker key is not stored on the client system, as doing so would allow the encrypted private key to be decrypted in the event the client system is compromised. At some point, the client system could receive encrypted data from a remote system. Generally, the encrypted data represents any data that has been encrypted (e.g., using a public key corresponding to the private key) and that can be decrypted through the use of the private key.

In response to determining that the encrypted data can be decrypted using the private key, embodiments transmit a request to the remote system for a locker key corresponding to the encrypted private key and could receive, from the remote system, the requested locker key. The private key could then be decrypted using the received locker key and the decrypted private key could, in turn, be used to decrypt the encrypted data. Advantageously, doing so provides a technique for accessing the encrypting data, while ensuring that the encrypted data cannot be accessed in the event either the client system or the remote system is compromised. Rather, the encrypted data could only be accessed in the unlikely event that both the client system and the remote system are compromised.

Figure 1:
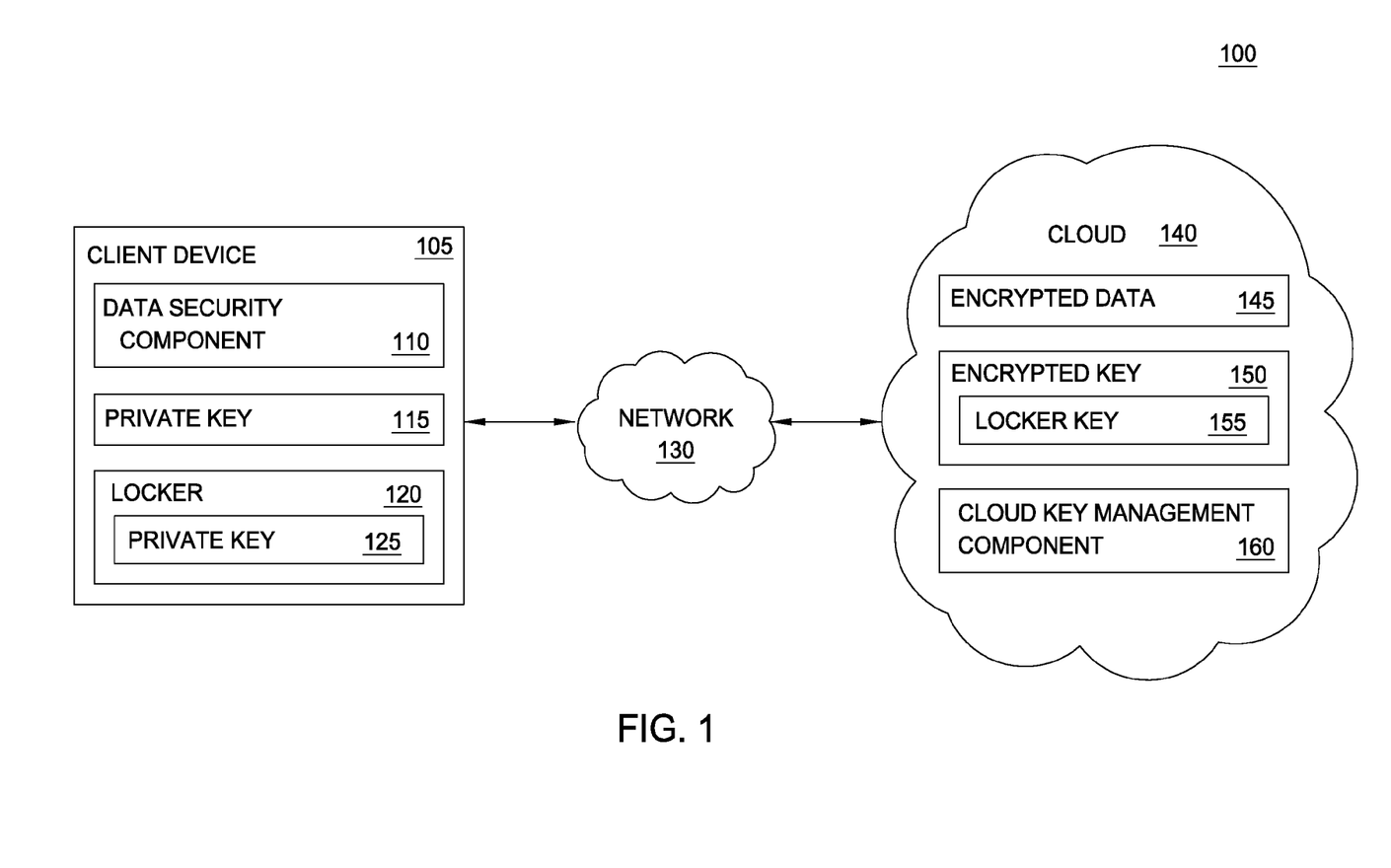
FIG. 1 illustrates a system configured with a data security component, according to one embodiment described herein.

FIG. 1 illustrates a system configured with a data security component, according to one embodiment described herein. As shown, the system 100 includes a client device 105 and a cloud computing environment 140, connected via a network 130. The client device includes a data security component 110, a private key 115, and a locker 120 containing a private key 125. Generally, the locker 120 represents an encrypted form of the private key 125 that, if decrypted using the locker key 155, results in the private key 125. The cloud computing environment 140 contains encrypted data 145, an encrypted key 150, and a cloud key management component 160. Likewise, the encrypted key 150 represents an encrypted form of the locker key 155 that can be decrypted using the private key 115.

Of note, although the encrypted data 145 is stored within the cloud environment 140, the private key 125 capable of decrypting the data 145 is not stored within the cloud 140, but rather is stored on the client device 105. Thus, even in the event the cloud environment 140 is compromised, a third party cannot gain access to the encrypted data 145. Moreover, even upon receiving the encrypted data 145 from the cloud 140, the client device 105 cannot immediately decrypt the encrypted data 145, as the private key 125 is encrypted within the locker 120. Advantageously, doing so ensures that neither the client device 105 nor the cloud 140 alone contains the requisite information for decrypting the data 145, protecting the data 145 from unauthorized accesses in the event that one of the client device 105 and the cloud 140 are compromised.

While the client device 105 and the cloud 140 cannot individually decrypt the data 145, embodiments provide techniques for accessing the encrypted data 145. For example, the client device 105 could receive the encrypted data 145 from the cloud computing environment 140. Generally, the data security component 110 is configured to decrypt the encrypted data using the private key 125. While the data security component 110 could determine that the received encrypted data can be decrypted using the decrypted private key 125, the data security component 110 could further determine that the private key 125 is currently encrypted (i.e., as represented by the locker 120). In response, the data security component 110 could transmit a request to the remote system for a locker key corresponding to the encrypted private key. For example, such a request could include the private key 115, which generally represents a key that can be used for decrypting the encrypted locker key 150.

Upon receiving the request, the cloud key management system 160 could decrypt the encrypted key 150 (e.g., using the private key 115 specified within the request), and the cloud key management component 160 could return the locker key 155 to the data security component 110. Upon receiving the locker key 155, the data security component 110 could use the locker key 155 to decrypt the locker 120 in order to recover the private key 125. The data security component 110 could then use the private key 125 to decrypt the encrypted data. Doing so enhances the security of the system 100 by preventing a third party from decrypting the data in the event either the client device 105 or cloud 140 is compromised. To this end, the data security component 110 could then purge the decrypted private key 125 and the received locker key, once the data security component 110 has finished decrypting the data.

In one embodiment, the data security component 110 is implemented as a JavaScript program within a web page and that is executed by a web browser on the client device 105. For example, such a web page could be received from a web server within the cloud 140, along with the encrypted data 145. The script within the web page could then be executed in order to perform a series of operations for decrypting the encrypted data. In such an embodiment, the encrypted private key 120 may be stored in browser storage of the web browser, e.g., a part of a name-value pair. For example, the browser storage could be storage as defined by the HTML5 Storage specification (also known as the W3C® Web Storage specification), and the data security component 110 could store the encrypted private key in such browser storage for use in decrypting data received from the cloud 140. For example, the encrypted private key could be stored as a value in a name-value pair having a name associated with the "cisco.com" domain.

Figure 2:
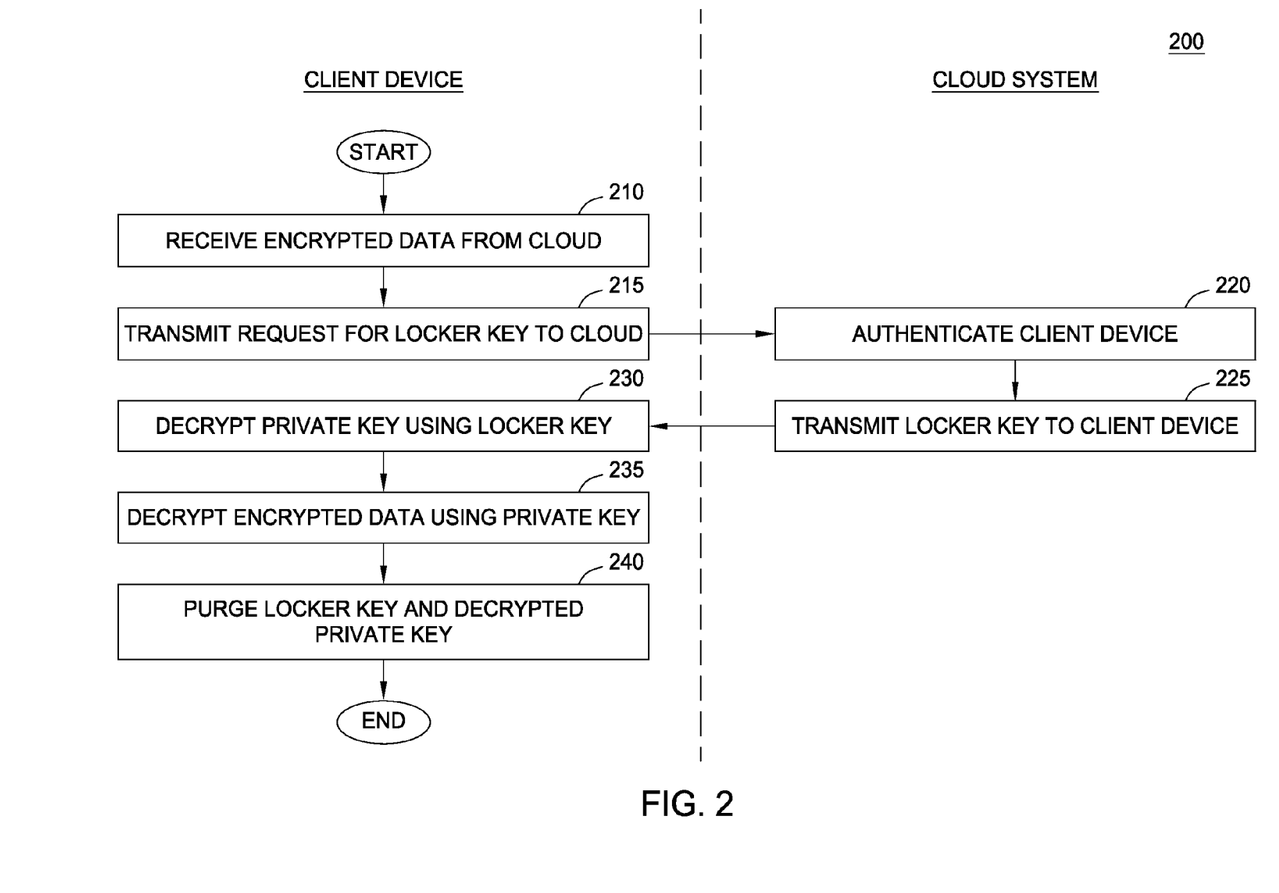
FIG. 2 is a flow diagram illustrating a method for decrypting data, according to one embodiment described herein.

FIG. 2 is a flow diagram illustrating a method for decrypting data, according to one embodiment described herein. As shown, the method 200 begins at block 210, where a data security component 110 receives encrypted data from a cloud computing environment. For example, the data could be received by a web browser executing on the client device, and the data could be received from a web server corresponding to a web application server executing on the cloud system. Upon receiving the encrypted data, the data security component 110 could determine that the data can be decrypted using a particular private key stored in an encrypted form on the client device, and could further determine that a locker key is needed to decrypt the private key. In response, the data security component 110 could transmit a request for the locker key to the cloud system (block 215).

Upon receiving the request, the cloud system could authenticate the client device (block 220). For example, the request could include login and password information (e.g., input by a user in response to a prompt within the web browser on the client device), and the data security component 110 could authenticate the login and password information before returning the requested locker key to the client device. Additionally, upon authenticating the client device, the cloud system could perform one or more authorization operations, to ensure that the client device is authorized to access the locker key. More generally, it is contemplated that the cloud system may perform any type of authentication or authorization operation for the cloud device upon receiving the request.

Of course, if such authentication and/or authorization operations do not establish the identity of the client device or establish that the client device is authorized to access the locker key, the cloud system could return an error code to the client device, rather than the requested locker key. In the depicted example, however, assume that the authentication of the client device is successful, and thus the cloud system transmits the locker key to the client device (block 225). Upon receiving the locker key, the data security component 110 decrypts the encrypted private key using the received locker key (block 230).

As discussed above, the data security component 110 and the cloud key management component 160 are not limited to any particular cryptographic algorithm, and more generally it is contemplated that the data security component 110 and the cloud key management component 160 may use any algorithm suitable for decrypting data, consistent with the functionality described herein. Once the private key is decrypted, the data security component 110 decrypts the encrypted data suing the private key (block 235). The data security component 110 then purges both the received locker key and the decrypted private key (block 240), and the method 200 ends.

In one embodiment, the data security component 110 is configured to purge the locker key and the decrypted private key immediately after decrypting the encrypted data. In a particular embodiment, the data security component 110 maintains at least the decrypted private key for some duration (e.g., the length of a single session between the web browser and a web server and/or web application server within the cloud computing environment). Preferably, however, the data security component 110 does not maintain the decrypted private key indefinitely, as doing so would allow the encrypted data to be accessed if the client device is compromised.

Figure 3:
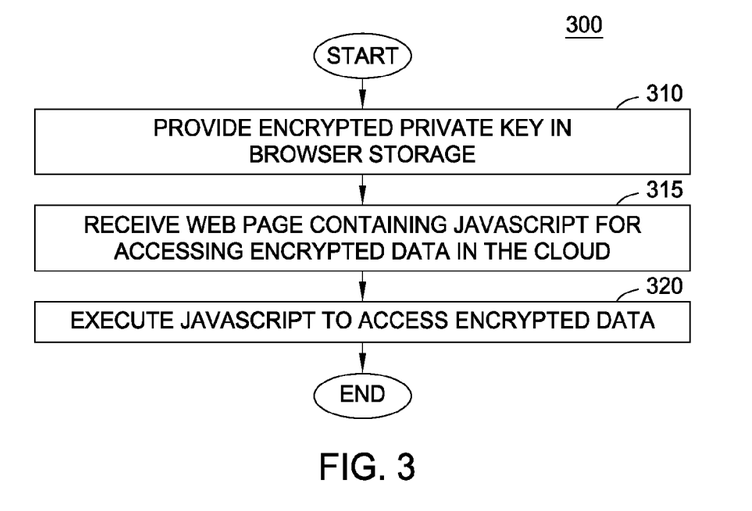
FIG. 3 is a flow diagram illustrating a method for accessing encrypted data, according to one embodiment described herein.

As discussed above, in one embodiment the data security component 110 is implemented as program code (e.g., JavaScript) within a web page that is executed by a web browser of the client device. FIG. 3 is a flow diagram illustrating a method for accessing encrypted data, according to one embodiment described herein. As shown, the method 300 begins at block 310, where an encrypted private key is provided within browser storage of a client device. For example, the encrypted private key could be stored as part of a name-value pair in browser storage implemented according to the HTML5 (or Web Storage) specification.

The client device then receives a web page containing the data security component 110, which in this example is implemented as JavaScript program code for accessing encrypted data within the cloud (block 315). The encrypted data could be, for example, contained within a storage medium accessible by the client device or could be received by the client device, e.g., from the cloud system in addition to the web page. The web browser of the client device then executes the JavaScript program code (i.e., the data security component 110) to access the encrypted data (block 320), and the method 300 ends. Advantageously, implementing the data security component 110 using program code within a web page enables embodiments to be deployed on any computing system having a web browser capable of executing the program code and providing browser storage for use by the data security component 110.

Figure 4A:
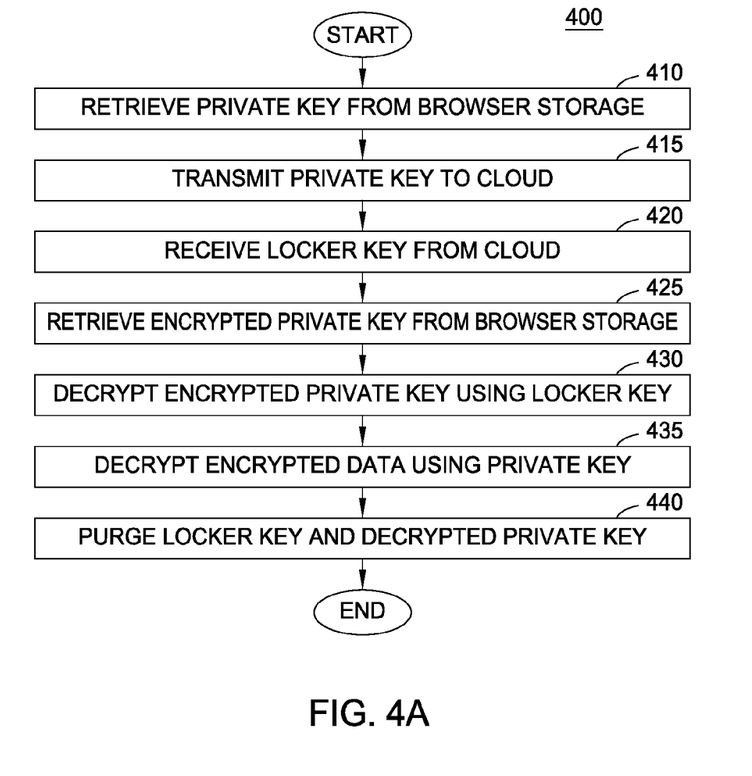
FIGS. 4a-b are flow diagrams illustrating methods for retrieving a locker key for use in decrypting data, according to embodiments described herein.
Figure 4B:
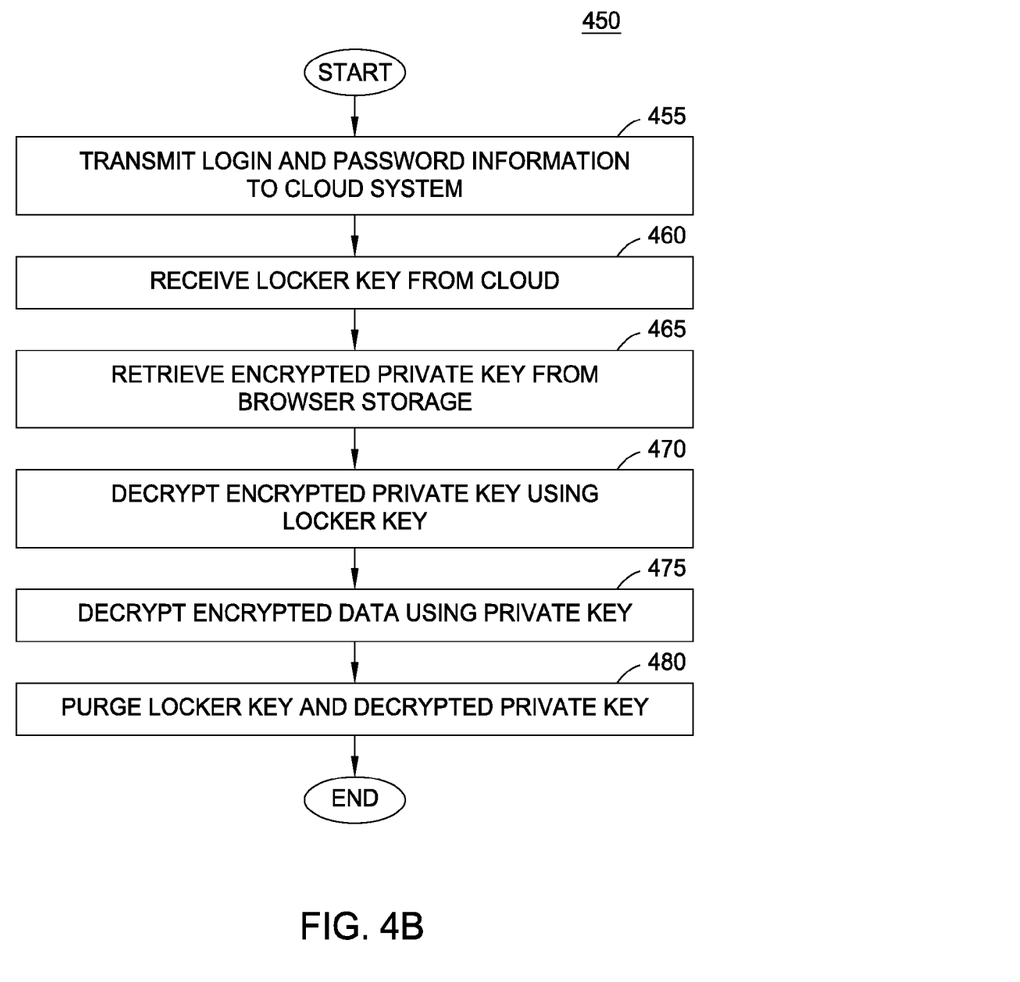

Generally, the data security component 110 may perform various different operations in accessing the encrypted data. Two such operations are shown in FIGS. 4a-b, which are flow diagrams illustrating methods for retrieving a locker key for use in decrypting data, according to embodiments described herein. FIG. 4A depicts an embodiment in which an additional private key is maintained on the cloud device (i.e., within browser storage as part of a name-value pair in the depicted example), and is transmitted to the cloud system for use in authenticating the client device. As shown, the method 400 begins at block 410, where the data security component 110 retrieves an additional private key from the browser storage. In this embodiment, the cloud key management component 160 within the cloud computing environment is configured to store a locker key in an encrypted format, and the additional private key maintained by the client device can be used to decrypt the encrypted locker key. As discussed above, the locker key generally represents a key that can be used to decrypt the encrypted private key (i.e., the key for decrypting the encrypted data) on the client device.

Upon retrieving the additional key, the data security component 110 transmits a request for the locker key to the cloud key management component 160 on the cloud system, the request specifying the retrieved additional key (block 415). In response, the data security component 110 receives the requested locker key from the cloud key management component 160 (block 420). Here, the cloud key management component 160 could be configured to verify the received additional key (e.g., using a checksum) and to decrypt an encrypted locker key stored within the cloud using the key specified within the request. In this embodiment, the cloud key management component 160 could infer that the data security component 110 requesting the locker key is authenticated and authorized to access the locker key, by nature of the data security component 110 possessing the key needed to decrypt the locker key. Of course, the cloud key management component 160 could also perform any number of additional authentication and/or authorization operations (e.g., requiring the request to also specify a particular password), in order for the client device to access the decrypted locker key. Additionally, upon returning the decrypted locker key to the client device, the cloud key management component 160 could be configured to purge the decrypted locker key.

Upon receiving the locker key, the cloud key management component 160 retrieves the encrypted private key from browser storage (block 425). For example, the encrypted private key could be stored as the value of a predefined name-value pair, and the data security component 110 could be configured to use the predefined name to retrieve the encrypted private key. The data security component 110 then decrypts the encrypted private key using the locker key (block 430), and uses the decrypted private key to decrypted the encrypted data (block 435). At some point, the data security component 110 purges both the received locker key and the decrypted private key (block 440), and the method 400 ends. For example, the data security component 110 could be configured to purge the keys immediately after decrypting the encrypted data.

An alternate embodiment is shown in FIG. 4B, where the data security component 110 is configured to use credentials information (i.e., a login and a password) to retrieve the locker key from the cloud computing environment. As shown, the method 450 begins at block 455, where the data security component 110 transmits login and password information to the cloud key management component 160. For example, a web page being displayed by the web browser on the client system could prompt a user to enter the login and password information, and this information could be transmitted (e.g., over a secure network session) to the cloud key management component 160 for verification. As discussed above, such verification information can include one or more authentication and/or authorization operations.

For purposes of the present example, assume that the cloud key management component 160 has successfully authenticated the credentials information specified within the request, and has further determined that the credentials information pertain to an entity authorized to retrieve the locker key. Moreover, assume that the cloud key management component 160 has transmitted the locker key to the data security component 110 on the client device, in response to such successful authentication and authorization operations. The data security component 110 then receives the locker key (block 460) and retrieves the encrypted private key from the browser storage on the client device (block 465). The data security component 110 then decrypts the retrieved private key using the locker key (block 470), and uses the decrypted private key to decrypt the encrypted data (block 475). Additionally, the data security component 110 purges the received locker key and the decrypted private key (block 480), and the method 450 ends.

Of note, while the methods 400 and 450 relate to a data security component 110 implemented within a web browser (e.g., as JavaScript code within a web page), such an implementation is for illustrative purposes only and is without limitation. More generally, it is contemplated that that the data security component 110 could be implemented in any number of different ways, consistent with the present disclosure. For example, the data security component 110 could be implemented as part of a standalone software application executing on the client device. In such an embodiment, the data security component 110 may be configured to store the encrypted private key in any storage location accessible by the client device. Moreover, while the aforementioned embodiments are described with respect to data (e.g., encrypted data, locker keys, etc.) received from a cloud computing environment, such examples are provided without limitation and are merely illustrative of various embodiments of the present disclosure. More generally, the data security component 110 may be configured to interact with a variety of types of remote systems (within or outside of a cloud computing environment) to facilitate the decryption of the encrypted data.

Figure 5:
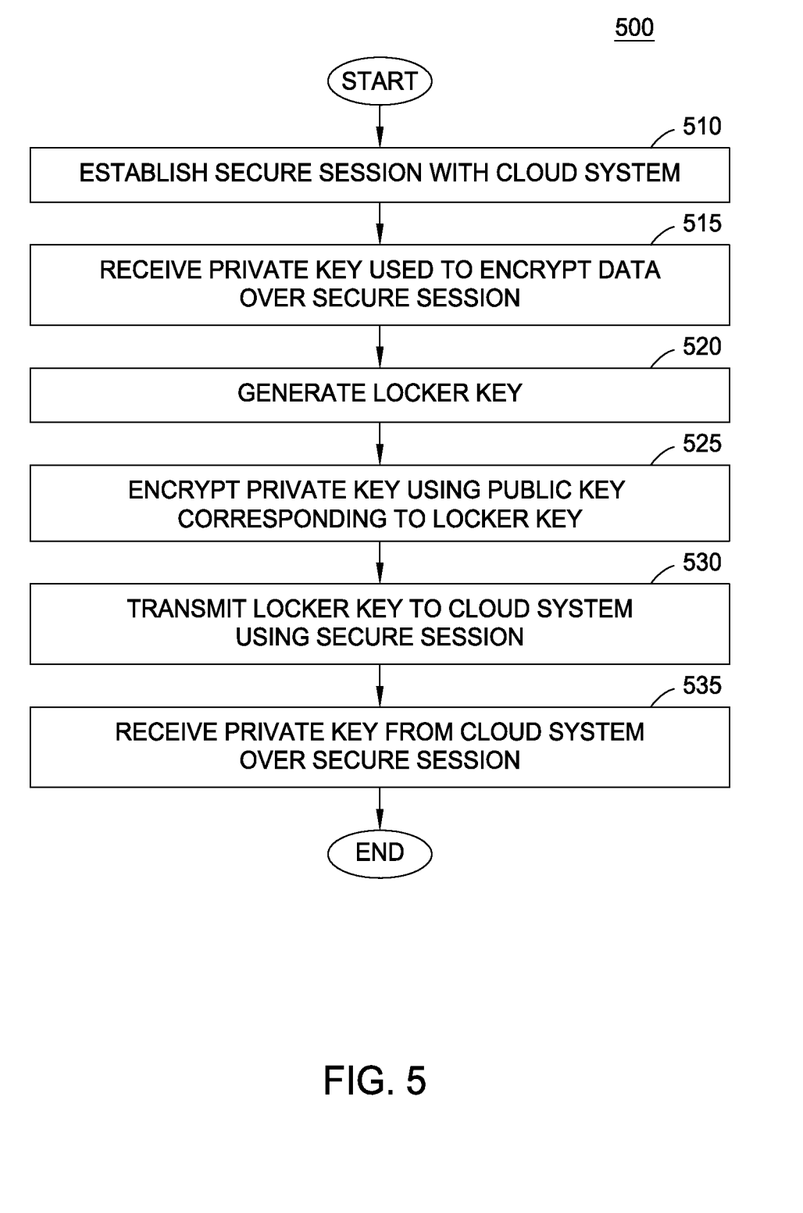
FIG. 5 is a flow diagram illustrating a method for configuring a client system, according to one embodiment described herein.

While some embodiments described above refer to an encrypted private key within storage of the client device, it is generally contemplated that a variety of different techniques may be employed to insert such an encrypted private key into the client storage. One example of such a technique is shown in FIG. 5, which is a flow diagram illustrating a method for configuring a client system, according to one embodiment described herein. As shown, the method 500 begins at block 510, where the data security component 110 establishes a secure session with a cloud key management component 160. Generally, the secure session represents any network connection between the data security component 110 and the cloud key management component 160, where the data transmitted across the network connection is encrypted using one or more cryptography techniques. The data security component 110 then receives a private key used to encrypt particular data over the secure network session (block 515).

Upon receiving the private key, the data security component 110 generates a locker key using one or more cryptography techniques (block 520) and encrypts the private key, e.g., using a public key corresponding to the generated locker key (block 525). As discussed above, any cryptography technique (known or unknown) capable of encrypting data, such that a particular key is required to decrypt the data, may be used consistent with the present disclosure. In the depicted embodiment, the data security component 110 then transmits the locker key to the cloud key management component 160 over the secure session (block 530). Upon transmitting the locker key, the data security component 110 could be configured to purge the locker key from the client device, so that the locker key must be retrieved from the cloud key management system 160 in order to access the encrypted private key.

For purposes of the present example, assume that the cloud key management component 160, in response to receiving the locker key, generates an additional private key and encrypts the locker key using a public key corresponding to the additional private key. The cloud key management component 160 could then store the encrypted locker key, and could transmit the additional private key to the data security component 110 over the secure session. Upon transmitting the additional private key, the cloud key management component 160 could purge the additional private key from the cloud computing environment, such that the additional private key must be retrieved (e.g., from the data security component 110) to decrypt the locker encrypted key. The data security component 110 then receives the private key from the cloud key management component 160 over the secure session (block 535), and the method 500 ends.

Figure 6:
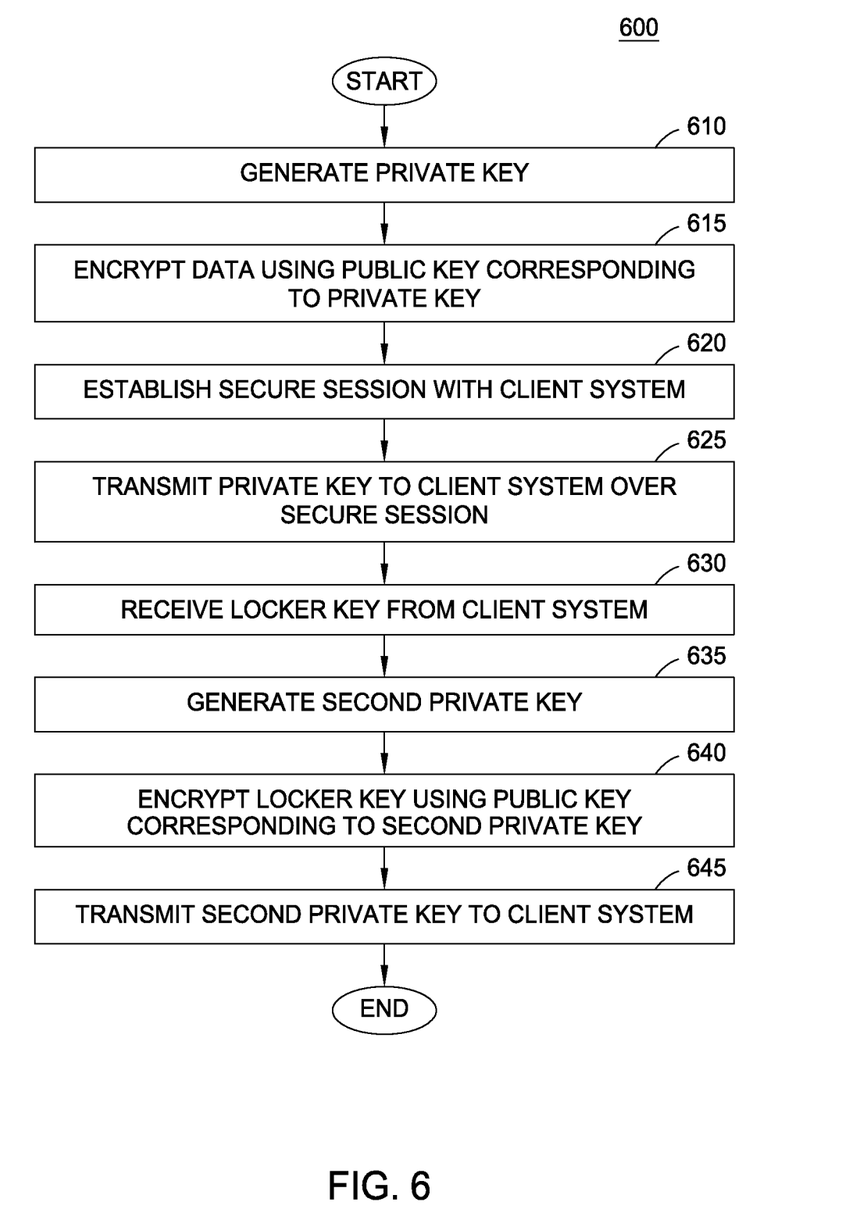
FIG. 6 is a flow diagram illustrating a method for configuring a cloud system, according to one embodiment described herein.

FIG. 6 is a flow diagram illustrating a method for configuring a cloud system, according to one embodiment described herein. Here, while the method 500 depicts an exemplary series of operations for distributing keys between the client and cloud systems from the perspective of the data security component 110, the method 600 depicts an exemplary series of operations from the perspective of the cloud key management component 160. As shown, the method 600 begins at block 610, where the cloud key management component 160 generates a private key (block 610). Additionally, the cloud key management component 160 encrypts data using a public key corresponding to the generated private key (block 615). Of note, while the private key is shown as being generated by the cloud key management component 160 in this example, such a depiction is for illustrative purposes only and more generally any technique for generating the private key can be used, consistent with the functionality described herein.

Returning to the method 600, the cloud key management component 160 establishes a secure network session with a data security component 110 on a client system (block 620), and transmits the private key to the data security component 110 using the secure network session (block 625). Again, the secure network session represents any connection in which the data transmitted over the connection is encrypted using one or more cryptographic techniques. Additionally, while the methods 500 and 600 include transmitting keys between the cloud key management component 160 and the data security component 110, such a depiction is for illustrative purposes only. More generally, the keys may be distributed between the client device and the cloud computing environment using a variety of different techniques. For example, in one embodiment, the keys may be manually provided to the client device, e.g., by a system administrator.

For purposes of this example, assume that the data security component 110 is configured to encrypt the received private key and is configured to transmit a locker key capable of decrypting the encrypted private key to the cloud key management component 160. The cloud key management component 160 then receives the locker key (block 630). In some embodiments, the cloud key management component 160 may be configured to store the locker key in unencrypted form. However, in the depicted embodiment, the cloud key management component 160 is configured to generate a second private key (block 635) and to encrypt the locker key using a public key corresponding to the second private key (block 640). The cloud key management component 160 then transmits the second private key to the data security component 110 over the secure network session (block 645), and the method 600 ends. Advantageously, doing so ensures that the encrypted data (i.e., the data encrypted at block 615) cannot be decrypted, in the event that either the client device or the cloud computing environment are compromised, and that the data can only be accessed in the extremely unlikely event that both systems are compromised.

Figure 7:
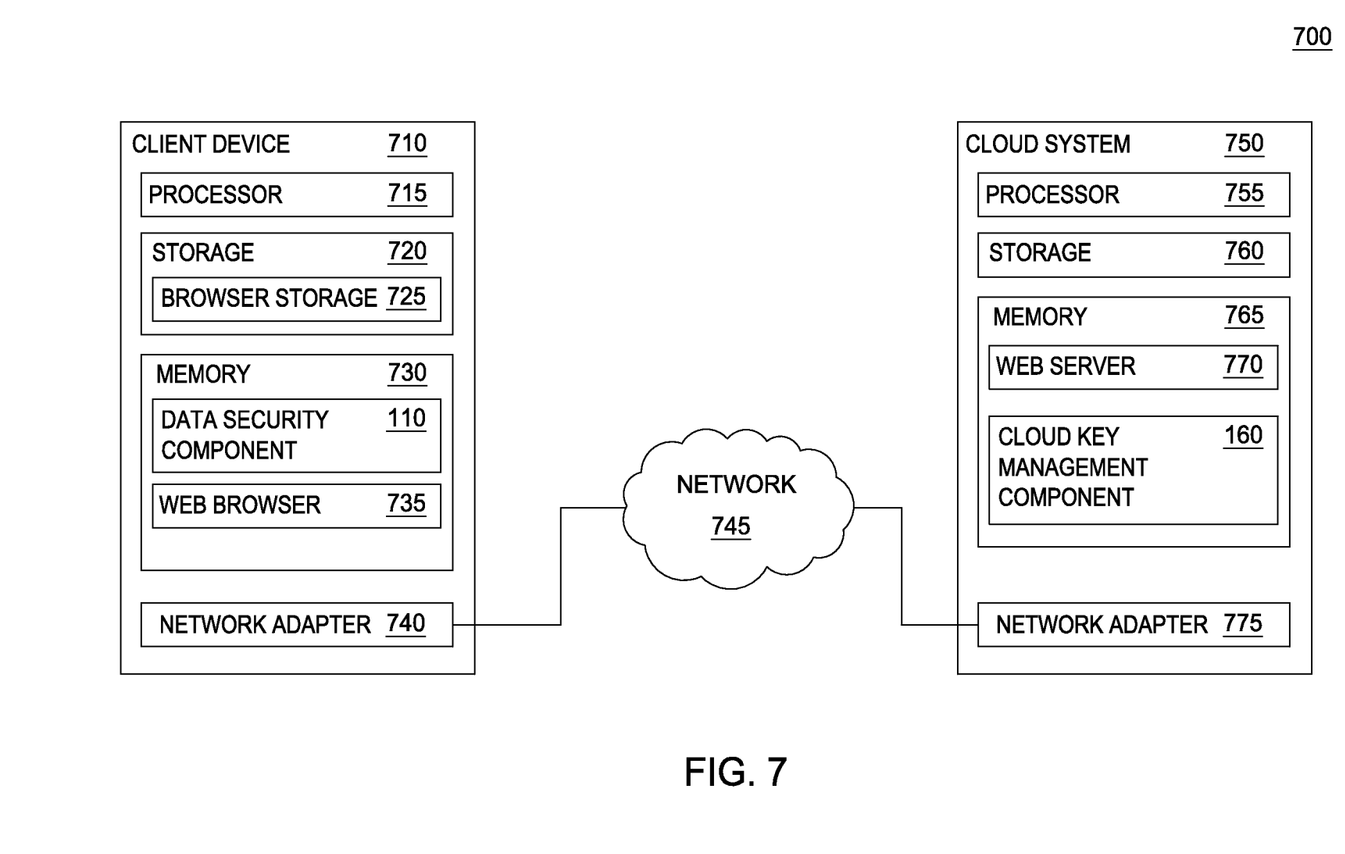
FIG. 7 is a block diagram illustrating a system configured with a data security component, according to one embodiment described herein.

FIG. 7 is a block diagram illustrating a system configured with a data security component, according to one embodiment described herein. The system 700 includes a client device 710, coupled to a cloud system 750 via a network 745. The client device 710 includes a processor 715, storage 720, memory 730, and a network adapter 740. The processor 715 may be any processing element capable of performing the functions described herein. The processor 715 represents single processor, multiple processors, a processor with multiple cores, and combinations thereof. The storage 720 represents any volatile or non-volatile memory, which may include flash memory, hard disk drives, and so on. Here, storage 720 includes browser storage 725, which generally represents a data store that is accessible by web browser 735. For example, the browser storage 725 could include data stored using the HTML5 Storage specification (also known as the W3C® Web Storage specification). While storage 720 is show within the client device 710, it is contemplated that storage 720 may also include any remote storage device(s) communicatively coupled to the client device 710.

The memory 730 may be either volatile or non-volatile memory and include, RAM, flash, cache, disk drives and the like. Although shown as a single entity, the memory 515 may be divided into different memory storage element such as RAM and one or more hard disk drives. Here, the memory 515 includes a data security component 110 and a web browser 735. Generally, as discussed above, the data security component 110 is configured to decrypt data through the use of a private key stored in an encrypted form within the browser storage 725.

Generally, the network 745 represents any communications network suitable for connecting two or more computing devices (e.g., the Internet). In the depicted embodiment, the network adapter 740 facilitates data communications between the client device 710 and the network 745 (as well as systems connected to the network, such as the cloud system 750). The network adapter 740 may use either wired or wireless communication techniques to transmit data to, and receive data from, the network 745.

The cloud system 750 includes a processor 755, storage 760, memory 765 and a network adapter 775. The processor 755 may be any processing element capable of performing the functions described herein. The processor 755 represents a single processor, multiple processors, a processor with multiple cores, and combinations thereof. The memory 765 may be either volatile or non-volatile memory and include, RAM, flash, cache, disk drives and the like. The memory 765 contains a web server 770 and a cloud key management component 160. The network adapter 775 facilitates communication between the cloud system 750 and the network 745. The network adapter 775 may use either wired or wireless communication techniques to transmit data to, and receive data from, the network 745.

Generally, the browser storage 725 includes at least one encrypted private key that can be decrypted using a locker key. The private key may be encrypted and stored within the browser storage 725 in a variety of ways, and examples include (without limitation) the data security component 110 receiving the encrypted private key and storing it within browser storage 725, the data security component 110 encrypting the private key and storing the encrypted private key within browser storage 725, a manual operation (e.g., by a system administrator), and so on. Preferably, however, the locker key (i.e., the key used to decrypt the private key within the browser storage 725) is not stored on the client device 710, but rather is stored on a remote system (e.g., the cloud system 750).

In the depicted embodiment, the data security component 110 could receive encrypted data from the cloud system 750, where the encrypted data can be decrypted using the decrypted private key. For example, the web browser 735 could access a web page hosted by the web server 770 to retrieve the encrypted data. More generally, however, it is broadly contemplated that the encrypted data may be received in any fashion, consistent with the functionality described herein. The data security component 110 could then determine that the encrypted data can be decrypted using the decrypted private key in browser storage 725. The data security component 110 could access the encrypted private key within the browser storage 725 and to perform a series of operations to decrypt the private key, for use in accessing the encrypted data. In one embodiment, the data security component 110 represents JavaScript code within a web page retrieved by the web browser 735 from the web server 770.

For example, the data security component 110 could transmit a request to the remote system for a locker key corresponding to the encrypted private key. In one embodiment, the data security component 110 is configured to specify an additional key within such a request. Such an additional key could be retrieved, e.g., from the browser storage 725. Here, the cloud key management component 160 may maintain the locker key in an encrypted form within the cloud computing environment (e.g., within storage 760), and the additional key represents the key used to decrypt the encrypted locker key.

Upon receiving the request specifying the additional key, the cloud key management component 160 could use the additional key to decrypt the encrypted locker key, and could transmit the decrypted locker key to the data security component 110. In one embodiment, the cloud key management component 160 infers the data security component 110 is an authorized party for purposes of accessing the encrypted locker key, based on the additional key specified within the request. In another embodiment, the cloud key management component 160 is configured to perform at least one of an authentication operation and an authorization operation before decrypting the locker key and returning the locker key to the data security component 110. For example, the cloud key management component 160 could solicit login and password information from a user (e.g., using a notification displayed at the client device 710 via web browser 735), and could verify the login and password information before decrypting and returning the locker key.

Upon receiving the locker key from the cloud system 750, the data security component 110 decrypts the encrypted private key using the received locker key. The data security component 110 could then use the decrypted private key to decrypt the encrypted data. Upon decrypting the data, the data security component 110 could purge the decrypted private key, as well as the locker key received from the cloud system 750. Advantageously, doing so allows the client device 710 to access the encrypted data received from the cloud system 750, while ensuring that neither the client device 710 nor the cloud system 750 alone contains the requisite information for accessing the encrypted data. Thus, even if one of the client device 710 and the cloud system 750 are compromised, a third party still cannot decrypt the encrypted data, thereby enhancing the data security of the system 700.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   providing, at a client system, an encrypted private key, wherein the encrypted private key, when processed by a decryption operating using a locker key, produces a recovered private key, and wherein the encrypted private key is stored as a value in a name-value pair in a web browser on the client system;
   receiving encrypted data from a remote system operating within a cloud computing environment and configured to store the encrypted data on a storage device within the cloud computing environment;
   determining that the received encrypted data can be decrypted using the recovered private key produced by processing the encrypted private key;
   executing a program contained within a received web page to perform an operation for decrypting the encrypted data, comprising:
   transmitting a request to the remote system for the locker key corresponding to the encrypted private key;
   receiving, from the remote system, the requested locker key;
   performing a decryption operation on the encrypted private key using the received locker key to produce the recovered private key; and
   decrypting the encrypted data, using the recovered private key.

2. The method of claim 1, wherein the remote system is configured to authenticate and authorize the client system, responsive to receiving the request and before transmitting the requested locker key to the client system.

3. The method of claim 1, further comprising:
   upon decrypting the encrypted data, purging the private key.

4. The method of claim 1, further comprising:
   receiving the private key over a secure network session;
   encrypting the private key, using a second key; and
   storing the encrypted private key.

5. The method of claim 1, wherein the transmitted request includes a second key used to decrypt the locker key at the remote system.

6. A method, comprising:
   providing an encrypted locker key, wherein the encrypted locker key, when processed by a decryption operation using a first key, produces a recovered locker key;

transmitting encrypted data to a client system, wherein the encrypted data, when processed by a decryption operation using a recovered private key, produces recovered data;

transmitting a web page to the client system, wherein the web page contains a program that, when executed, performs an operation for decrypting the encrypted data;

receiving a request for the encrypted locker key, the request specifying the first key;

performing a decryption operation on the encrypted locker key using the first key to produce the recovered locker key; and transmitting the recovered locker key to the client system, wherein the client system is configured to execute the program contained within the web page to decrypt a private key using the recovered locker key and further configured to use the private key to decrypt the encrypted data, and wherein the client system is configured store the encrypted private key as a value in a name-value pair in a web browser on the client system.

7. The method of claim 6, further comprising:
performing an operation for authenticating and authorizing the client system, responsive to receiving the request and before transmitting the locker key to the client system.

8. The method of claim 6, wherein the client system is further configured to purge the private key, upon decrypting the encrypted data.

9. The method of claim 6, further comprising:
establishing a secure network session with the client system; and
transmitting the private key over the secure network session,
wherein the client system is configured to encrypt the private key, using a second key, and to store the encrypted private key.

10. A method, comprising:
receiving, within a browser application of a client system, one or more web pages from a remote system operating within a cloud computing environment and configured to store the encrypted data on a storage device within the cloud computing environment;

receiving, within the browser application of the client system, encrypted data from the remote system; and executing program code within the received one or more web pages to perform an operation, comprising:
determining that the encrypted data can only be decrypted using both (i) first key data stored as a value in a name-value pair in the browser application on the client system and (ii) second key data stored on the remote system;
retrieving the second key data from the remote system; and
decrypting the encrypted data, using both the first key data and the second key data.

11. The method of claim 10, wherein decrypting the encrypted data, using both the first key data and the second key data, further comprises:
decrypting the encrypted private key on the client system using the retrieved second key data to recover a private key; and
decrypting the encrypted data using the private key.

12. The method of claim 11, the operation further comprising:
upon decrypting the encrypted data, purging the private key.

13. The method of claim 10, wherein the remote system is configured to authenticate and authorize the client system, responsive to receiving request for the second key data, and prior to transmitting the second key data to the client system.

* * * * *